Nov. 23, 1965 J. ALBERANI 3,219,309
PRESSURE RATIO DEVICE
Filed May 9, 1962 3 Sheets-Sheet 3

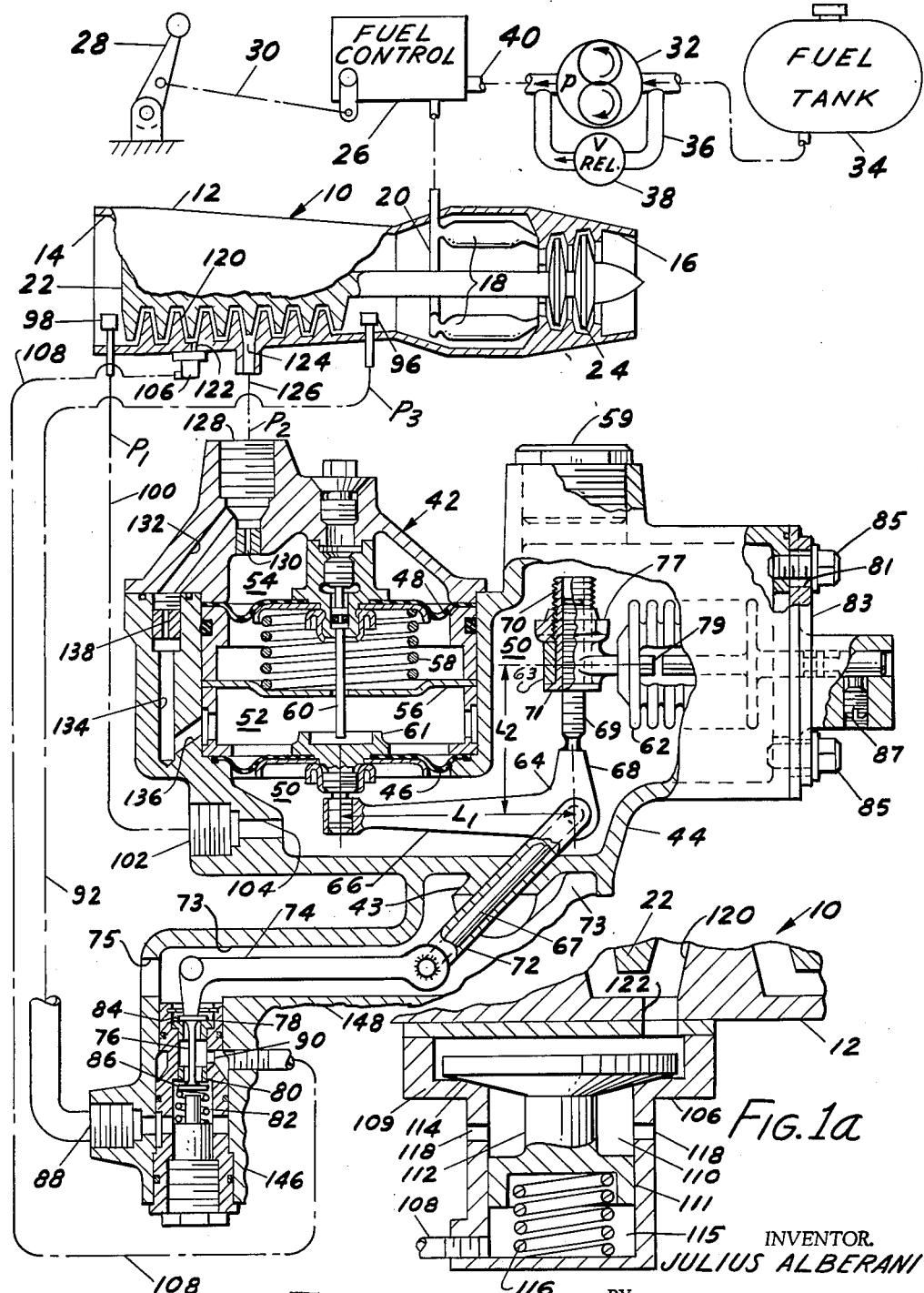

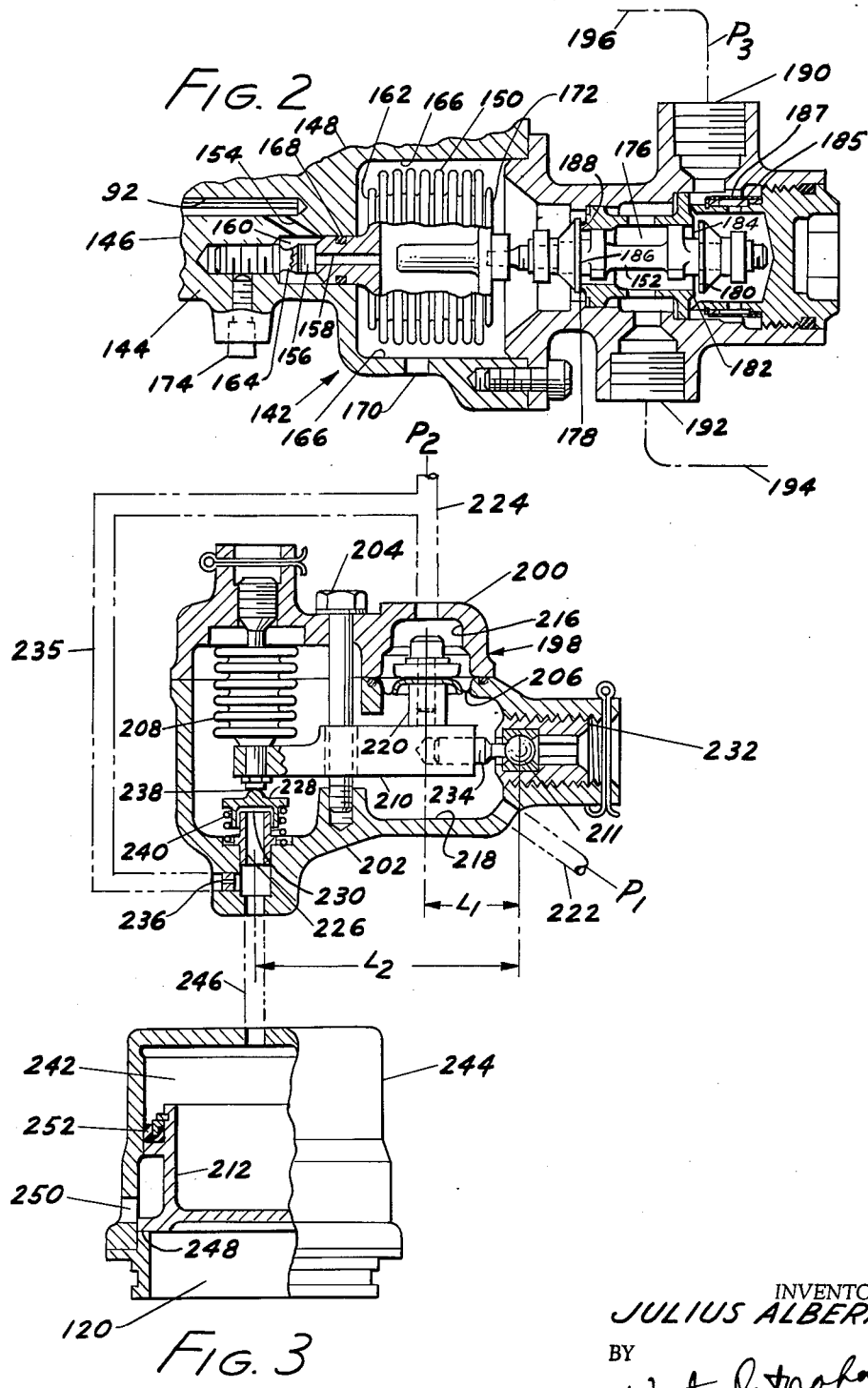

INVENTOR.
JULIUS ALBERANI
BY
Walter Pastroka, Jr.
ATTORNEY

United States Patent Office 3,219,309
Patented Nov. 23, 1965

3,219,309
PRESSURE RATIO DEVICE
Julius Alberani, Birmingham, Mich., assignor to Holley Carburetor Company, Warren, Mich., a corporation of Michigan
Filed May 9, 1962, Ser. No. 193,374
16 Claims. (Cl. 251—28)

This invention relates generally to pressure ratio devices, and more specifically to pressure ratio means for controlling the compressor bleed valve of a gas turbine engine.

Many different mechanisms have been proposed in the past for controlling gas turbine engine compressor bleed valves. However, most of them are quite complicated and costly in that they usually require expensive feedback cams and/or other components which require extremely accurate machining.

Accordingly, it is an object of this invention to provide a pressure ratio responsive means adapted to control the position of a slave member such as a compressor bleed valve.

Other objects and advantages of the invention will become apparent from the following written description, when considered in conjunction with the attached drawings wherein:

FIGURE 1 is a schematic view, with portions thereof cut away and in cross-section, illustrating the adaptation of the invention to a gas turbine engine;

FIGURE 1A is an enlarged fragmentary cross-sectional view of a portion of FIGURE 1;

FIGURE 2 is a cross-sectional view of a supplementary device which may be used in conjunction with the invention;

FIGURE 3 is a fragmentary cross-sectional view illustrating a modification of the invention;

Figure 4:
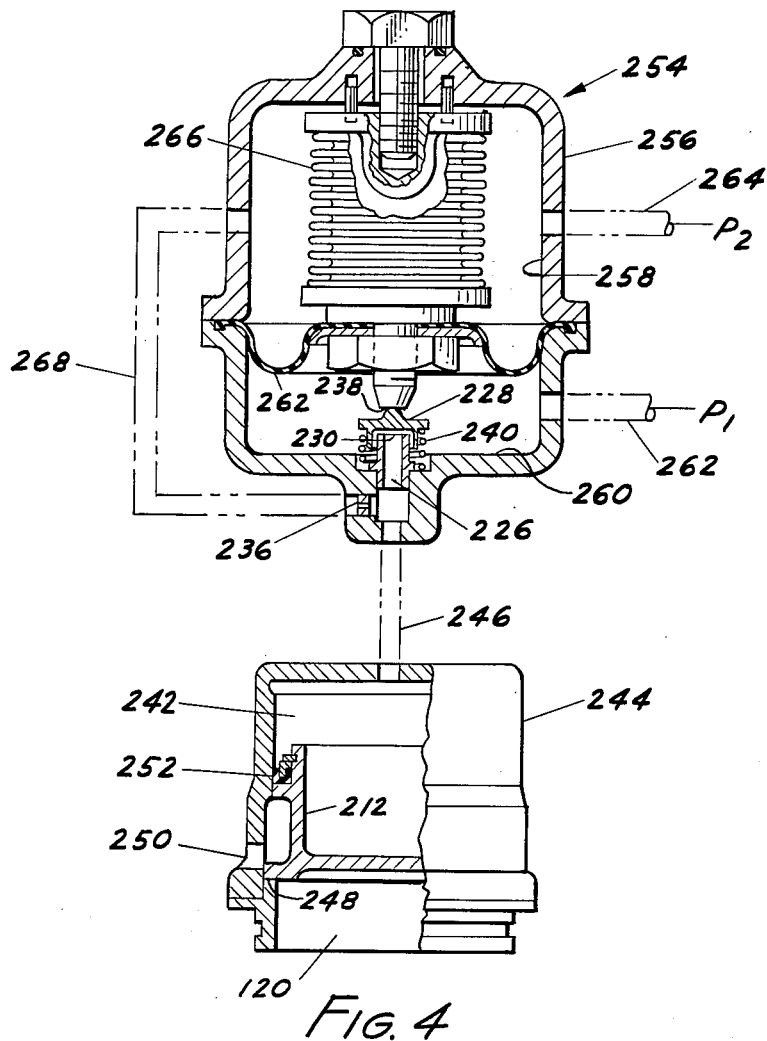
FIGURE 4 is a fragmentary cross-sectional view illustrating a second modification of the invention.

Referring now in greater detail to the drawings, FIGURE 1 illustrates a turbine engine 10 having an outer housing 12 with an air intake 14 and an exhaust nozzle 16. A combustion chamber 18 supplied by a fuel distribution ring 20 is located between the compressor 22 and the turbine 24.

The fuel distribution ring 20 receives metered fuel from a fuel control unit 26 which responds to an input request signal created by the pilot control lever 28 and transmitted by the linkage 30, along with other appropriate input signals created by other means responsive to additional operating conditions such as temperature, speed, altitude and compressor pressure. These various other input signal means do not form a part of the invention and are well known in the art; accordingly, they are not illustrated.

A gear pump 32 adapted to receive fuel from the fuel tank 34 may, of course, be provided in order to supply unmetered fuel to the control 26. A bypass conduit 36 having a relief valve 38 connected serially therewith may also be provided in order to maintain a relatively constant fuel pressure in conduit 40.

The pressure ratio device, illustrated generally at 42, is comprised of a body 44 containing diaphragms 46 and 48 secured therein so as to provide three distinct chambers 50, 52 and 54. Bracket 56 in chamber 52 serves as a mechanical stop to fixedly contain one end of spring 58, the other end of spring 58 operating against diaphragm 48. A stem 60 is rigidly attached in any convenient manner to diaphragm 48 and may, at times, come into contact with the seat 61, for a purpose which will be described later. Seat 61 is rigidly attached in any suitable manner to diaphragm 46, which is connected with a collar extension 63 of an evacuated bellows 62 by means of a lever 64 located in chamber 50. Lever 64 is comprised of arms 66 and 68 which are shown to be substantially perpendicular to one another. Arm 68 includes a threaded extension 69, and the effective length $L_2$ of arm 68 may be changed by some adjustment means, such as by an internally and externally threaded cylindrical cap 70 including a flange 71 on which the bellows collar 63 may rest. The collar 63 is held in place against the flange 71 by a locking nut 77.

The bellows shaft is broken, as at 79, to facilitate the adjustment of the bellows spring load by permitting movement of one end of the bellows 62 while the other end remains fixed. Once collar 63 is locked in the position desired, the evacuated bellows 62 may be properly aligned by means of slots 81 on the movable cover 83 and screws 85. Set screw 87 serves to hold the bellows 62 in place longitudinally.

A rigidly fixed tube 72 press-fitted into a boss 43 of body 44 acts both as a bearing for a shaft 67 and as a spacer preventing the lever 64 from moving laterally. The shaft 67 is rigidly fixed at its ends to the lever 64 and to a lever 74 located in chamber 73 so as to transmit movement of lever 64 via the lever 74 to a servo valve 76. Lever 74, like lever 64, is also prevented from moving laterally by the rigidly mounted spacer tube 72. Chamber 73 is continually vented to the atmosphere via port 75 for a purpose which will be described later.

Servo valve 76 closes either upon seat 78 or upon seat 80, depending upon the direction of movement of lever 74. When lever 74 is lifted away from servo valve 76, spring 82 and pressure $P_3$ will move the valve 76 against seat 80 and away from seat 78, thereby preventing communication between inlet 88 and outlet 90 and providing communication between chamber 73 and outlet 90 through the clearance 84. When lever 74 is moved against valve 76, spring 82 is compressed to reverse the above condition; that is, communication between chamber 73 and outlet 90 is prevented, and communication between inlet 88 and outlet 90 is accomplished through the clearance 86, as shown in FIGURE 1. The purpose of the above operation valve 76 will be described further on in the specification.

One end of conduit 92 is in continual communication with inlet 88, while the other end thereof is continually exposed to compressor outlet pressure $P_3$, as by means of a suitable pressure probe 96. A second pressure probe 98 is located upstream of the compressor 22 so as to sense and communicate the compressor inlet pressure $P_1$ to conduit 100, inlet 102 and thence via conduit 104 to chamber 50.

Housing 106, which may be either an integral part of the general housing 12 or separately attached thereto, is in continual communication with outlet 90 via conduit 108. Housing 106, which is better illustrated in FIGURE 1a, is comprised of a body 109 formed to provide a chamber 110 containing a valve 112, valve seat 114 and spring 116. Chamber 110 on one side of the valve 112 communicates with the atmosphere via ports 118, and on the other side of valve 112 with a selected stage 120 of the compressor 22 via port 122.

An intermediate pressure $P_2$ from a selected stage 124 of the compressor 22 is in continual communication with an inlet 128 of pressure ratio device 42 via a conduit 126. Conduit 126 thus communicates with chamber 54 via inlet 128 and restriction 130, and with chamber 52 via conduits 132, 134 and 136 and restriction 138.

FIGURE 2 illustrates an amplifier assembly 142 which may be used in conjunction with the pressure ratio device 42. The amplifier 142 comprises a body 144 which may be formed as an integral part of the pressure ratio body 44, as at surfaces 146 and 148, so as to be interposed in the system between outlet 90 and the bleed valve housing 106.

The body 144 houses a bellows 150 and a valve 152. Instead of leading directly to housing 106, conduit 108 now communicates with the inside of the bellows 150 via passages 154, 156 and 158 and chamber 160. The threaded extension 164 of the bellows 150 permits selective positioning thereof in chamber 160, the adjustment being maintained by means such as the set screws 174, so as to fixedly locate the end 162 of bellows 150 in chamber 166. Seal ring 168 surrounds extension 164 and serves to seal off chamber 166 from chamber 160. The bellows 150 is continually surrounded by atmospheric pressure, chamber 166 being vented to the atmosphere through port 170. The end 172 of the bellows 150 is rigidly connected to the valve 152, the latter being slidably positioned in chamber 176.

Annular port 178 communicates between chambers 166 and 176 when the valve 152 is in its extreme leftward position. In this position, face 180 of the valve 152 is against seat 182, closing off annular port 184. In the extreme rightward position of valve 152, face 186 is against seat 188, closing off annular port 178 and opening port 184 and providing communication between the inlet 190 and the outlet 192 via chamber 176 and ports 184 and 185 and screen 187. Conduit 194 is in continual communication between the outlet 192 and the housing 106, just as in the case of the conduit 108 of FIGURE 1 when amplifier 142 is not used, and compressor outlet pressure $P_3$ enters inlet 190 through conduit 196 branching off from conduit 92.

Operation

Turbine engines, regardless of whether they employ a single solid compressor, as illustrated, or a split compressor, always encounter the problem of compressor stall. The efficiency of the overall engine is dependent, primarily, on the rate at which air is supplied by the compressor. However, during certain periods of engine operation, some stages of the compressor will supply more air than subsequent stages can accommodate. As a consequence, stalling of certain compressor stages occurs, which results in surging air flow and fluctuations in compressor discharge pressure, thereby setting up dangerous engine vibrations. This problem is overcome, as previously indicated, by the provision of a compressor bleed assembly which serves to bleed certain stages of the compressor.

In describing the operation of the pressure ratio device disclosed herein, which is provided for controlling such a compressor bleed actuator, it may be best to first define the respective relationships of the pressures involved. In the embodiment disclosed, compressor inlet pressure $P_1$ is the lowest pressure. Compressor discharge pressure $P_3$ is the highest pressure involved, with pressure $P_2$ being some intermediate pressure between $P_1$ and $P_3$. Atmospheric pressure would, at any time, be something slightly less than $P_1$.

The invention contemplates that bleeding some selected stage of the compressor can be regulated by controlling the ratio, $P_2/P_1$, and the force balance equation for the system disclosed can be seen to be:

$(P_2-P_1)(\text{Area of diaphragm } 46)(L_1)$
$\qquad = P_1(\text{Area of bellows } 62)(L_2)$ Transposing:

$$\frac{P_2-P_1}{P_1} = \frac{(\text{Area of bellows } 62)(L_2)}{(\text{Area of diaphragm } 46)(L_1)}$$

Dividing numerator and denominator by $P_1$:

$$\frac{\frac{P_2}{P_1}-1}{1} = \frac{(\text{Area of bellows } 62)(L_2)}{(\text{Area of diaphragm } 46)(L_1)}$$

Solving for $\frac{P_2}{P_1}$:

$$\frac{P_2}{P_1} = \frac{(\text{Area of bellows } 62)(L_2)}{(\text{Area of diaphragm } 46)(L_1)} + 1$$

In this equation $L_2$ is equal to the length of arm 68 of lever 64, and $L_1$ is the length of arm 66 of lever 64.

It can thus readily be seen that the ratio of $P_2/P_1$ can be changed to any desired ratio merely by changing the area of the diaphragm 46, the area of the evacuating bellows 62, or the length of the levers $L_1$ or $L_2$. The adjustment means 70, as shown in FIGURE 1, is illustrative of one method which may be used to change the length $L_2$ of the arm 68.

The overall operating principle of the invention is that bleeding of the stage 120 of the compressor is accomplished by opening the valve 112 under certain conditions of engine operation so that air (excess pressure) can escape into the atmosphere through ports 122 and 118. The pressure at the stage 120 of the compressor to be bled is somewhere between $P_1$ and $P_2$ pressure. This intermediate pressure acting on the area of the valve 112 is sufficient to maintain valve 112 closed on the seat 114 against the force of spring 116, unless the high pressure $P_3$, which is the actuating pressure for the valve 112, is supplied to the chamber 115 through the conduit 108. The device 42, through the above described cooperation of the diaphragm 46, bellows 62, lever 64, lever 74 and valve 76, controls the supply of the high $P_3$ actuating pressure to the chamber 115.

Let is now be assumed that the engine 10 is being operated at conditions which produce a pressure ratio $P_2/P_1$ which is below the controlling ratio, as determined by the design and adjustment of device 42. Under these conditions, the resultant force of the bellows $62 \times L_2$ would be greater than the resultant force of the diaphragm $46 \times L_1$, thereby causing lever 64 to be rotated in a clockwise direction. This would rotate the lever 74 away from servo valve 76, causing the latter to move upwardly under the force of the spring 82 and pressure $P_3$ so as to open the port 84 and close the port 86.

Thus, with the servo valve 76 in the above described position so that port 84 is open and port 86 is closed, $P_3$ pressure cannot be supplied through the conduit 108 to chamber 115 and chamber 115 is in communication with atmosphere through conduit 108 and ports 84 and 75. Under these conditions, bleeding of stage 120 could not occur.

Let is now be assumed that the ratio $P_2/P_1$ is greater than the control ratio, as determined by the selected sizes of diaphragm 46 and bellows 62 and the adjustments of the effective arm lengths of lever 64. The force of diaphragm $46 \times L_1$ would then be greater than the force of bellows $62 \times L_2$. This unbalanced force would cause the shaft 72 to rotate counterclockwise, thereby forcing servo valve 76 downwardly against the force of the spring 82 and pressure $P_3$ so as to close port 84 and open port 86. The high pressure $P_3$ will then communicate with the bleed valve 112 via conduit 108, thereby lifting the bleed valve 112 from the seat 114 and permittings stage 120 to be bled to the atmosphere via ports 122 and 118.

The additional diaphragm 48 has been incorporated in the system as a safety device. In other words, there is the possibility that diaphragm 46 may become ruptured. If this were to happen, it can be seen that the pressure in chamber 54 would act upon the area of diaphragm 48 in the same manner in which the pressure in chamber 52 had acted upon the area of diaphragm 46. Downward movement of diaphragm 48 would move the stem 60 downwardly until it came into contact with seat 61, thereafter causing arm 66 of lever 64 to move in the same manner as it had previously been influenced by diaphragm 46.

Where very high pressures are involved, it is possible that leakage could occur past the portion 111 of the bleed valve 112 that is slidable in chamber 110 of the bleed valve housing 106. Any such leakage problem could be completely eliminated by use of the device 142 illustrated in FIGURE 2. Device 142 could be incorporated as an integral part of the pressure ratio device 42, or, if desired, as an added element in the line 108 leading to the bleed valve housing 106.

The FIGURE 2 device would be connected at its inlet 190 with a source of high pressure such as $P_3$ via a conduit 196, which could branch off from conduit 92 at any convenient point and at its outlet 192 with conduit 108 leading to chamber 115 of housing 106. When the $P_2/P_1$ ratio is less than the control ratio and port 86 is thus closed as already described above, the inside of the bellows 150 would be vented to atmospheric pressure through port 75, port 84, outlet 90 and conduits 108, 154, 156 and 158. Although the bellows 150 has an area greater than the effective area of the valve 152 its area does not come into play because the chamber 166 is also vented to atmosphere through port 170; thus, the high pressure $P_3$ will act on the valve 152 and force it to the left, closing port 184 and opening port 178. This vents the spring side of the bleed valve 112 to atmospheric pressure of chamber 166 through port 178 and outlet 192 and conduit 194 and prevents bleeding of stage 120, as explained previously.

Under operating conditions that cause the servo valve port 86 to be opened in a manner which has been described above, the high $P_3$ pressure is free to communicate with the inside of the bellows 150 via port 86, outlet 90 and conduits 108, 154, 156 and 158. $P_3$ pressure multiplied by the area of the bellows 150, as compared to the $P_3$ pressure from conduit 196 multiplied by the area of the valve 152, results in an unbalanced force forcing the valve 152 to the right so as to close off port 178 and open port 184. The high $P_3$ pressure from conduit 196 is thus free to communicate with chamber 115 of bleed valve 112 via ports 184 and 185, screen 187, outlet 192 and conduit 194, the latter leading to chamber 115. This would cause the bleed valve 112 to be raised from the seat 114, thereby bleeding stage 120 of the compressor to the atmosphere via ports 118.

FIGURE 3 illustrates a modification of the invention which may be used in engine applications wherein the engine compressor pressures would be considerably lower than that for which the FIGURE 1 and 2 devices were designed. It is comprised of a housing 198 made up of top and bottom halves 200 and 202, respectively, held together by any suitable means such as a bolt 204. The housing 198 contains a diaphragm 206, bellows 208 and a lever 210, the latter being pivoted at 211.

The above items cooperate to actuate a bleed valve 212 associated with some preselected compressor stage 120 of the turbine engine 10. Diaphragm 206 confined between the two body halves 200 and 202 forms chambers 216 and 218, and it is connected to the lever 210 by means of a link 220 located at a distance $L_1$ from the pivot point 211. Evacuated bellows 208 is connected to the lever 210 at a distance $L_2$ from the pivot point 211. Compressor inlet pressure $P_1$ is communicated to chamber 218 through a conduit 222, while pressure $P_2$ existing at a point downstream of the stage 210 of the compressor is communicated to chamber 216 via a conduit 224.

It is readily apparent that the force balance equation for this system would be:

$(P_2 - P_1)$(area of diaphragm 206)$(L_1)$
$= P_1$(area of bellows 208)$(L_2)$

Therefore:

$$\frac{P_2}{P_1} = \left(\frac{\text{Area of bellows } 208 \times L_2}{\text{Area of diaphragm } 206 \times L_1}\right) + 1$$

It should be noted that the above equation ignores the effect of the relatively small force which would exist on the lever 210 by virtue of the area of seat 230 of conduit 226 being covered by the poppet valve 228. However, the construction of this modification of the invention is such that it is possible to compensate for this merely by changing the $L_2/L_1$ ratio of the lever 210. The adjusting nut 232 and the pivot screw 234 are both comprised of the same number of threads per inch and, therefore, by rotating both simultaneously, $L_1$ and $L_2$ would be changed the same amount. Since $L_1$ and $L_2$ are changed the same amount, the ratio of $L_2/L_1$ changes.

In addition to the communication of compressor inlet pressure $P_1$ into chamber 218 via conduit 222 and compressor pressure $P_2$ into chamber 216 via conduit 224, a conduit 235 branches from conduit 224 so as to allow $P_2$ to be communicated through a restriction 236 and into conduit 226 below the poppet valve 228.

In describing the operation of the modification shown by FIGURE 3, let it first be assumed that the pressure ratio $P_2/P_1$ is below the control ratio as determined by the sizes of the evacuated bellows 208 and the diaphragm 206 and the adjustments on the lever 210. The resultant force across the diaphragm 206 multiplied by the length of the lever arm $L_1$ would be less than the force of the bellows 208 multiplied by the length of the lever arm $L_2$, and the summation of forces would be such that the lever 210 would be rotated clockwise about pivot point 211. This would permit the poppet valve 228, which is in contact with the lever 210 at point 238, to be lifted from seat 230 under the force of spring 240.

Chamber 218 is thus placed in communication with chamber 242 of the compressor bleed housing 244 by means of conduits 226 and 246. The compressor pressure $P_2$ would have dropped due to the restriction 236, and the resultant reduced pressure would become commingled with the still lower pressure $P_1$ in chamber 218 to the extent that the combined pressure in chamber 242 would approach $P_1$ and be lower than the pressure at compressor stage 120, thus causing the bleed valve 212 to be moved away from the seat 248 and permitting the compressor stage 120 to be bled to the atmosphere through port 250.

A single seal 252 within the body 244 surrounding the bleed valve 212 would be sufficient to prevent leakage of the intermediate compressor pressure into the chamber 242. In other words, the working pressures assumed in this case would be such that an auxiliary unit such as that shown by FIGURE 2 would not be required to prevent leakage past the bleed valve 212.

Let it next be assumed that the pressure ratio $P_2/P_1$ is greater than the critical ratio for which a particular dimension and adjustment of bellows 208, diaphragm 206 and lever 210 have been selected. The force of the diaphragm 206 multiplied by the lever arm $L_1$ would be greater than the force of the bellows 208 multiplied by the length of lever arm $L_2$, resulting in the lever 210 being rotated counterclockwise about pivot point 211 so as to close the poppet valve 228 against seat 230 by compressing the spring 240. Inasmuch as the pressure $P_1$ is thus prevented from being communicated to chamber 242, the pressure in chamber 242 will approach $P_2$ pressure, which is higher than the intermediate pressure at the compressor stage 120. This would cause the bleed valve 212 to close against seat 248, thus closing off the bleeding of the compressor stage 120 through the port 250.

FIGURE 4 is illustrative of still another modification of the invention. This modification may be employed, for example, where it is desirable to operate a slave member such as the compressor bleed valve 212 in response to a selected ratio of $P_2/P_1$, where $P_1$ could represent compressor inlet pressure and $P_2$ could again represent either compressor discharge pressure or some compressor pressure downstream of stage 120 in an engine application wherein the compressor pressures would be considerably lower than the compressor pressures for which the FIGURE 1 construction was designed.

Those parts which are the same as the elements used in the FIGURE 3 modification will be identified by the same reference numerals. The housing 254 comprises a body 256 which is divided by a diaphragm 262 into two chambers 258 and 260. Pressure $P_1$ enters chamber 260 via a conduit 262, whereas pressure $P_2$ enters chamber 258 via a conduit 264.

In this FIGURE 4 modification, an evacuated bellows 266 and the diaphragm 262 are arranged directly in line with a poppet valve 228. Since the area of the seat 230 at the end of conduit 226 is again small as compared to the areas of the diaphragm 262 and the bellows 266, it can be safely ignored. It can readily be seen, therefore, that the force balance equation would be substantially as follows:

$$P_2(\text{Area of bellows 266}) = (P_2-P_1)(\text{Area of Diaphragm 262})$$

Therefore, $$\frac{P_2}{P_1} = \frac{\text{Area of diaphragm 262}}{\text{Area of diaphragm 262} - \text{Area of bellows 266}}$$

Since the right side of the equation would always be equal to a constant, say $K_1$, it can be seen that: $P_2 = K_1 P_1$.

Thus, if $P_1$ remains fixed and $P_2$ were to increase, the net force would be a downward force against the poppet valve 228 at point 238, which would cause the poppet valve 228 to close on seat 230 against the force of the spring 240.

Therefore, the pressure $P_2$ which has been reduced by virtue of having gone through the restriction 236 in conduit 268, is prevented from flowing into the chamber 260 by the closed poppet valve 228 and is free to enter chamber 242 only. The pressure in chamber 242 would build up until it became the same as pressure $P_2$. Since the pressure $P_2$ would be higher than the pressure in the preselected stage 120 of the compressor 22, the bleed valve 212 would be closed against the seat 248, thereby preventing any bleeding off through port 250.

If $P_1$ remains fixed and $P_2$ were to decrease, the net force would be an upward force allowing the spring 240 to push the poppet valve 228 off the seat 230. The pressure in chamber 242 and conduits 246 and 226 would then be free to bleed off into chamber 260, thus reducing the pressure in chamber 242 until it becomes substantially equal to $P_1$. The intermediate pressure from the compressor stage 120, being greater than $P_1$, would therefore unseat the bleed valve 212 and bleed stage 120 to the atmosphere through the port 250.

In the event that the pressure in compressor stage 120 were higher than $P_2$ in a given application of the FIGURE 2 or FIGURE 3 structures, the bleed valve could, of course, be designed so as to operate satisfactorily. In that situation, the housing 244 of FIGURES 2 and 3 could have a suitable spring incorporated in the chamber 242 thereof, or the configuration of the valve could be such that it would have a larger area on its actuating pressure side than on its compressor side.

The invention and the modifications thereof have been disclosed and described in conjunction with a turbine engine only by way of example, since it is apparent that the invention could be practiced in any environment requiring operation by a constant pressure ratio. Accordingly, no limitations other than those defined by the scope of the appended claims are intended.

What I claim as my invention is:

1. A pressure ratio device comprising first and second housings, a slave member and valve seat in said first housing, a diaphragm and a bellows in said second housing influenced by two distinct fluid pressures, a valve means in said second housing having a resilient means biasing said valve means closed and being opened at times against said resilient means by the action of said diaphragm and bellows, a third pressure intermediate said two distinct fluid pressures and a fourth pressure higher than said two distinct fluid pressures for influencing said slave member and an outlet in said first housing, said outlet being uncovered by said slave member by said fourth pressure when said valve means is open for bleeding said intermediate pressure to the atmosphere.

2. A pressure ratio device comprising first and second housings, a slave member and valve seat in said first housing, a diaphragm and a bellows in said second housing influenced by two distinct fluid pressures, a moment arm influenced by said diaphragm and bellows, a valve means in said second housing having a spring biasing said valve means in a closed direction and being influenced at times by said moment arm in an open direction against said spring, third and fourth pressures for influencing said slave member, and an outlet in said first housing, said outlet being at times uncovered by said slave member for bleeding said third pressure to the atmosphere, said slave member being moved in the direction which uncovers said outlet by said fourth pressure when said valve means is open.

3. A pressure ratio device comprising first and second housings, a slave member and valve seat in said first housing, a diaphragm and a bellows in said second housing influenced by two distinct fluid pressures, a moment arm influenced by said diaphragm and bellows, a servo valve in said second housing having a resilient means biasing said servo valve in a closed direction and being influenced at times by said moment arm in an open direction against said resilient means, a third pressure intermediate said two distinct fluid pressures for influencing said slave member, an outlet in said first housing for bleeding said intermediate pressure to the atmosphere, when said slave member is off said valve seat and a fourth highest pressure for forcing said slave member away from said valve seat when said servo valve is open.

4. A pressure ratio device comprising first and second housings, a slave member and valve seat in said first housing, a pair of diaphragms and a bellows in said second housing influenced by two distinct fluid pressures, a moment arm influenced by said bellows and one of said pair of diaphragms until said one of said pair becomes ruptured and then by the other of said pair of diaphragms, a valve means in said second housing having a resilient means biasing said valve means in a closed direction and being influenced at times by said moment arm in an open direction against said resilient means, a third pressure intermediate said two distinct fluid pressures for influencing said slave member, an outlet in said first housing for bleeding said intermediate pressure to the atmosphere when said slave member is away from said valve seat, and a fourth distinct fluid pressure for forcing said slave member away from said valve seat when said valve means is open.

5. A pressure ratio device comprising first and second housings, a slave member and valve seat in said first housing, a plurality of pressure responsive means arranged in parallel in said second housing influenced by two distinct fluid pressures, a lever having two arms substantially perpendicular to one another, said arms influenced by two of said plurality of pressure responsive means, a servo valve in said second housing having a resilient means biasing said servo valve in a closed direction and being influenced at times by said moment arm in an open direction against said resilient means, a third pressure intermediate said two distinct fluid pressures for influencing said slave member, and an outlet in said first housing for bleeding said intermediate pressure to the atmosphere when said servo valve is open.

6. A pressure ratio device comprising a first housing, a slave member in said first housing, a second housing, first and second pressure responsive members contained within said second housing so as to form first, second and third chambers therein, a first lever pivotally secured in said first housing, said first lever having first and second arms forming substantially a right angle, said first arm being rigidly connected to said first pressure responsive member, a third pressure responsive member in said first chamber rigidly connected to said second arm, a source of low pressure fluid for influencing said first and third pressure responsive members in said first chamber, a source of intermediate pressure fluid for influencing said first and second pressure responsive members in said second and third chambers, a third housing, a member having first and second valves at the ends thereof forming fourth and fifth chambers in said third housing, first and second valve seats for said first and second valves, a second lever pivotally located in said fourth chamber, said second lever having third and fourth arms forming substantially a right angle, said third arm being in contact with said first valve, resilient means in said fifth chamber biasing said second valve against said second valve seat, a shaft rigidly connecting said second lever in said third housing for movement with said first lever in said second housing, a source of high pressure for said fifth chamber, conduit means including said first and second valves for at times communicating between said fifth chamber and said first housing and for at other times communicating between said fourth chamber and said first housing, a third valve seat for said slave member, a first outlet in said fourth chamber for bleeding said first housing to the atmosphere at such times as said slave member is against said third valve seat, a source of a fourth pressure intermediate said low and high pressures for influencing said slave member, and an outlet in said first housing for bleeding said fourth pressure to the atmosphere at such times as said slave member is away from said third valve seat.

7. A pressure ratio device comprising a first housing, a slave member in said first housing, a second housing, first and second diaphragms contained within said second housing so as to form first, a second and third chambers therein, a first lever pivotally located in said first chamber, said first lever having first and second arms forming substantially a right angle, said first arm being rigidly connected to said first diaphragm, a bellows in said first chamber rigidly connected to said second arm, a source of low pressure fluid for influencing said first diaphragm and said bellows in said first chamber, a source of intermediate pressure fluid for influencing said first and second diaphragms in said second and third chambers, a third housing, a member having first and second valves at the ends thereof forming fourth and fifth chambers in said third housing, first and second valve seats for said first and second valves, a second lever pivotally located in said fourth chamber, said second lever having third and fourth arms forming substantially a right angle, said third arm being in contact with said first valve, a spring in said fifth chamber biasing said second valve against said second valve seat, a shaft rigidly connecting said second lever in said third housing for movement with said first lever in said second housing, a source of high pressure for said fifth chamber, a conduit means including said first and second valves for at times communicating between said fifth chamber and said first housing and for at other times communicating between said fourth chamber and said first housing, a third valve seat for said slave member, a first outlet in said fourth chamber for bleeding said first housing to the atmosphere at such times as said slave member is against said third valve seat, a source of a fourth pressure intermediate said low and high pressures for influencing said slave member, and an outlet in said first housing for bleeding said fourth pressure to the atmosphere at such times as said slave member is away from said third valve seat.

8. A pressure ratio device comprising a first housing, a slave member in said first housing, a second housing, a first pressure responsive member contained within said second housing so as to form first and second chambers therein, a first lever pivotally located in said first chamber, said first lever having first and second arms forming substantially a right angle, said first arm being rigidly connected to said first pressure responsive member, a second pressure responsive member in said first chamber rigidly connected to said second arm, a source of low pressure fluid for influencing said first and second pressure responsive members in said first chamber, a source of intermediate pressure fluid for influencing said first pressure responsive members in said second chamber, a third housing, a member having first and second valves at the ends thereof forming third and fourth chambers in said third housing, first and second valve seats for said first and second valves, a second lever pivotally located in said fourth chamber, said second lever having third and fourth arms forming substantially a right angle, said third arm being in contact with said first valve, a resilient means in said fifth chamber biasing said second valve against said second valve seat, a shaft rigidly connecting said second lever in said third housing for movement with said first lever in said second housing, a source of high pressure for said fourth chamber, a conduit means including said first and second valves for at times communicating between said fourth chamber and said first housing and for at other times communicating between said third chamber and said first housing, a third valve seat for said slave member, a first outlet in said third chamber for bleeding said first housing to the atmosphere at such times as said slave member is against said third valve seat, a source of a fourth pressure intermediate said low and high pressures for influencing said slave member, and an outlet in said first housing for bleeding said fourth pressure to the atmosphere at such times as said slave member is away from said third valve seat.

9. A pressure ratio device comprising a first housing, a slave member in said first housing, a second housing, a diaphragm contained within said second housing so as to form first and second chambers therein, a first lever pivotally located in said first chamber, said first lever having first and second arms forming substantially a right angle, said first arm being rigidly connected to said diaphragm, a bellows in said first chamber rigidly connected to said second arm, a source of low pressure fluid for influencing said diaphragm and said bellows in said first chamber, a source of intermediate pressure fluid for influencing said diaphragm in said second chamber, a third housing, a member having first and second valves at the ends thereof forming third and fourth chambers in said third housing, first and second valve seats for said first and second valves, a second lever pivotally located in said third chamber, said second lever having third and fourth arms forming substantially a right angle, said third arm being in contact with said first valve, a spring in said fourth chamber biasing said second valve against said second valve seat, a shaft rigidly connecting said second lever in said third housing for movement with said first lever in said second housing, a source of high pressure for said fourth chamber, a conduit means including said first and second valves for at times communicating between said fourth chamber and said first housing and for at other times communicating between said third chamber and said first housing a third valve seat for said slave member, a first outlet in said third chamber for bleeding said first housing to the atmosphere at such times as said slave member is against said third valve seat, a source of a fourth pressure intermediate said low and high pressures for influencing said slave member, and an outlet in said first housing for bleeding said fourth pressure to the atmosphere at such times as said slave member is away from said third valve seat.

10. A pressure ratio device comprising a first and second housing, a slave member and valve seat in said first housing, a plurality of pressure responsive means in said second housing influenced by two distinct fluid pressures, a moment arm influenced by said plurality of pressure responsive means, a first valve means in said second housing having a resilient means biasing said first valve means in one direction and being influenced at times by said moment arm in the opposite direction against said resilient means, a third pressure intermediate said two distinct fluid pressures for influencing said slave member, an outlet in said first housing for at times bleeding said intermediate pressure to the atmosphere, a fourth highest pressure for at times forcing said slave member away from said valve seat, a third housing, an additional pressure responsive means in said third housing influenced by said fourth highest pressure, a second valve means in said third housing influenced by said additional pressure responsive means, a conduit communicating between said second valve means and said slave member and a passageway communicating between said first valve means and the interior of said additional pressure responsive means.

11. A pressure ratio device, comprising first and second housings, a slave member and valve seat in said first housing, three pressure reponsive means in said second housing influenced by said two distinct fluid pressures, a moment arm influenced by two of said three pressure responsive means, a first valve means in said second housing having a resilient means biasing said first valve means in one direction and being influenced at times by said moment arm in the opposite direction, a third pressure intermediate said two distinct fluid pressures for influencing said slave member, an outlet in said first housing for at times bleeding said intermediate pressure to the atmosphere, a fourth highest pressure for at times forcing said slave member off said valve seat, a third housing, an additional pressure responsive means in said third housing influenced by said fourth highest pressure, a second valve means in said third housing influenced by said additional pressure responsive means, a conduit communicating between said second valve means and said slave member and a passageway communicating between said first valve means and the interior of said additional pressure responsive means.

12. A pressure ratio device comprising a first housing, a slave member in said first housing, a second housing, first and second pressure responsive members contained within said second housing so as to form first, second and third chambers therein, a first lever pivotally located in said first chamber, said first lever having first and second arms forming substantially a right angle, said first arm being rigidly connected to said first pressure responsive member, a third pressure responsive member in said first chamber rigidly connected to said second arm, a source of low pressure fluid for influencing said first and third pressure responsive members in said first chamber, a source of intermediate pressure fluid for influencing said first and second pressure responsive members in said second and third chambers, a third housing, a member having first and second valves at the ends thereof forming fourth and fifth chambers in said third housing, first and second valve seats for said first and second valves, a second lever pivotally located in said fourth chamber, said second lever having third and fourth arms forming substantially a right angle, said third arm being in contact with said first valve, a resilient means in said fifth chamber biasing said second valve against said second valve seat, a shaft rigidly connecting said second lever in said third housing for movement with said first lever in said second housing, a source of high pressure for said fifth chamber, a third valve seat for said slave member, a source of a fourth pressure intermediate said low and high pressures for influencing said slave member, and an outlet in said first housing for bleeding said fourth pressure to the atmosphere at such times as said slave member is away from said third valve seat, a fourth housing, a second member in said fourth housing having third and fourth valves at the ends thereof forming sixth and seventh chambers therein, fourth and fifth valve seats for said third and fourth valves respectively, a fourth pressure responsive means in said sixth chamber rigidly connected to said third valve, a first conduit means including said first and second valves for at times communicating between said fifth chamber and the interior of said fourth pressure responsive means and at other times communicating between said fourth chamber and the interior of said fourth pressure responsive means, a second conduit means including said third and fourth valves for at times communicating between said first housing and said sixth chamber and at other times communicating between said first housing and said seventh chamber, and a third conduit means communicating between said source of high pressure fluid and said seventh chamber.

13. A pressure ratio device comprising a first housing, a slave member in said first housing, a second housing, first and second diaphragms contained within said second housing so as to form first, second and third chambers therein, a first lever pivotally located in said first chamber, said first lever having first and second arms forming substantially a right angle, said first arm being rigidly connected to said first diaphragm, a bellows in said first chamber rigidly connected to said second arm, a source of low pressure fluid for influencing said first diaphragm and said bellows in said first chamber, a source of intermediate pressure fluid for influencing said first and second diaphragms in said second and third chambers, a third housing, a member having first and second valves at the ends thereof forming fourth and fifth chambers in said third housing, first and second valve seats for said first and second valves, a second lever pivotally located in said fourth chamber, said second lever having third and fourth arms forming substantially a right angle, said third arm being in contact with said first valve, a spring means in said fifth chamber biasing said second valve against said second valve seat, a shaft rigidly connecting said second lever in said third housing for movement with said first lever in said second housing, a source of high pressure for said fifth chamber, a third valve seat for said slave member, a source of a fourth pressure intermediate said low and high pressures for influencing said slave member, and an outlet in said first housing for bleeding said fourth pressure to the atmosphere at such times as said slave member is away from said third valve seat, a fourth housing, a second member in said fourth housing having third and fourth valves at the ends thereof forming sixth and seventh chambers therein, fourth and fifth valve seats for said third and fourth valves respectively, a second bellows in said sixth chamber rigidly connected to said third valve, a conduitry system including said first, second, third and fourth valves for at times communicating between said source of high pressure and the interior of said second bellows and at other times communicating between said source of high pressure and said first housing.

14. A pressure ratio device comprising a source of four distinct fluid pressures, first and second housings, a pair of chambers in said first housing, a slave member, a valve seat and an outlet in said first housing, said slave members forming a movable wall between said pair of chambers, a pair of pressure responsive devices, in said second housing, said pair of pressure responsive devices being influenced by two of said four distinct fluid pressures, a moment arm secured to said pair of pressure responsive devices, valve means controlled by said moment arm, the third of said four distinct fluid pressures in one of said pair of chambers for urging said slave member against said valve seat, the fourth of said four distinct fluid pressures in the other of said pair of chambers for urging said slave member away from said valve seat when said valve means is opened by said moment arm, thereby permitting said third pressure to be bled off through said outlet.

15. A pressure ratio device comprising a plurality of chambers, a servo valve in one of said chambers, a slave valve forming a movable wall between a second and a third of said plurality of chambers, a source of four distinct fluid pressures, a pair of pressure responsive devices in a fourth of said chambers, said devices being influenced by two of said four distinct fluid pressures, a moment arm operatively connected to said servo valve and influenced by the movements of said pair of pressure responsive devices, said slave valve being maintained closed by the third of said four distinct fluid pressures in said second chamber while said servo valve is closed and being urged open by the fourth of said four distinct fluid pressures in said third chamber when said servo valve is open, said third pressure being bled off through said outlet so long as said slave valve remains open.

16. A pressure ratio device comprising a source of four distinct fluid pressures, a chamber, a pair of pressure responsive devices in said chamber, a moment arm secured to said pair of pressure responsive devices, two of said four distinct fluid pressures for influencing said pair of pressure responsive devices, a servo valve operatively connected to said moment arm, second and third chambers, a slave valve forming a movable wall between said second and third chambers, the third of said four distinct fluid pressures being in said second chamber for urging said slave valve closed at all times, an outlet downstream of said slave valve, and the fourth of said four distinct fluid pressures being in said third chamber for opening said slave valve and bleeding off said third distinct fluid pressure through said downstream outlet during those times when said servo valve is opened by the action of said moment arm.

References Cited by the Examiner
UNITED STATES PATENTS

| | | | |
|---|---|---|---|
| 799,500 | 9/1905 | Squires | 251—28 XR |
| 1,631,262 | 6/1927 | Gourdon | 137—505 |
| 2,398,619 | 4/1946 | Clark et al. | 230—115 |
| 2,732,125 | 1/1956 | Ruby | 230—115 |
| 3,127,210 | 6/1964 | Gavin | 137—108 XR |

M. CARY NELSON, *Primary Examiner.*

MARTIN P. SCHWADRON, *Examiner.*